United States Patent
Lee et al.

(10) Patent No.: US 10,250,902 B2
(45) Date of Patent: Apr. 2, 2019

(54) METHOD FOR INDUCING MOTION INFORMATION IN MULTILAYER STRUCTURE AND APPARATUS USING SAME

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 425 days.

(21) Appl. No.: 14/890,204

(22) PCT Filed: May 26, 2014

(86) PCT No.: PCT/KR2014/004680
§ 371 (c)(1),
(2) Date: Nov. 10, 2015

(87) PCT Pub. No.: WO2014/189345
PCT Pub. Date: Nov. 27, 2014

(65) Prior Publication Data
US 2016/0100187 A1    Apr. 7, 2016

(30) Foreign Application Priority Data

May 24, 2013  (KR) .................. 10-2013-0059330
May 26, 2014  (KR) .................. 10-2014-0063158

(51) Int. Cl.
*H04B 1/66*    (2006.01)
*H04N 19/52*   (2014.01)
(Continued)

(52) U.S. Cl.
CPC ........... *H04N 19/52* (2014.11); *H04N 19/139* (2014.11); *H04N 19/176* (2014.11);
(Continued)

(58) Field of Classification Search
CPC .... H04N 19/52; H04N 19/139; H04N 19/176; H04N 19/187; H04N 19/33; H04N 19/59
See application file for complete search history.

(56) References Cited

U.S. PATENT DOCUMENTS

2009/0022221 A1    1/2009  Xie et al.
2013/0315571 A1   11/2013  Park et al.
(Continued)

FOREIGN PATENT DOCUMENTS

CN            101047860 A    10/2007
KR    10-2012-0117382 A    10/2012
(Continued)

*Primary Examiner* — Sathyanaraya V Perungavoor
*Assistant Examiner* — Peet Dhillon
(74) *Attorney, Agent, or Firm* — IP Legal Serevices, LLC

(57) ABSTRACT

The present invention relates to a method for encoding a video and a method for decoding a video in a multilayer structure, and an apparatus using the same. The method for decoding the video according to the present invention comprises the steps of: specifying a current layer reference location for specifying a current block from a current layer; specifying a reference layer reference location corresponding to the reference location of the current layer, from the reference layer; inducing motion information from the reference layer reference location based on the size of motion information saving units; and scaling the induced motion information and inducing the same into a motion vector used for recovering a picture in the current layer.

14 Claims, 8 Drawing Sheets

(51) Int. Cl.
  *H04N 19/33*  (2014.01)
  *H04N 19/139*  (2014.01)
  *H04N 19/176*  (2014.01)
  *H04N 19/187*  (2014.01)
  *H04N 19/59*  (2014.01)

(52) U.S. Cl.
  CPC .......... *H04N 19/187* (2014.11); *H04N 19/33* (2014.11); *H04N 19/59* (2014.11)

(56) References Cited

U.S. PATENT DOCUMENTS

| | | | |
|---|---|---|---|
| 2013/0329787 A1* | 12/2013 | Ramasubramonian | ..................... H04N 19/70 375/240.12 |
| 2014/0092970 A1* | 4/2014 | Misra | ..................... H04N 19/52 375/240.16 |

FOREIGN PATENT DOCUMENTS

| | | |
|---|---|---|
| WO | 2012/050301 A2 | 4/2012 |
| WO | 2012/108701 A2 | 8/2012 |
| WO | 2013/051897 A1 | 4/2013 |
| WO | 2013/051899 A2 | 4/2013 |

\* cited by examiner

METHOD FOR INDUCING MOTION INFORMATION IN MULTILAYER STRUCTURE AND APPARATUS USING SAME

CROSS REFERENCE TO RELATED APPLICARIONS

This application is a National Stage Application of PCT International Patent Application No. PCT/KR/2014/004680 (filed on May 26, 2014) under 35 U.S.C. § 371, which claims priority to Korean Patent Application Nos. 10-2013-0059330 (filed on May 24, 2013) and 10-2014-0063158 (filed on May 26, 2014), the teachings of which are incorporated herein in their entireties by reference.

TECHNICAL FIELD

The present invention generally relates to a video compression technique and, more particularly, to a method for deriving the motion information of a current layer based on the information of a reference layer in a multilayer structure.

BACKGROUND ART

Recently, demand for high-resolution, high-quality video such as HD (High Definition) video and UHD (Ultra High Definition) video is increasing in various application fields. As video data has high-resolution, high-quality images, the amount of data is higher than for existing video data. Therefore, when the video data is transmitted using media such as existing wired and wireless broadband lines or is stored in existing storage media, transmission costs and storage costs increase. To solve these problems, caused by the high-resolution, high-quality video data, high-efficiency video compression techniques may be used.

As video compression techniques, there are various techniques such as an inter prediction technique for predicting the number of pixels included in a current picture from the picture preceding or following the current picture, an intra prediction technique for predicting the number of pixels in the current picture using information about the pixels included in the current picture, an entropy coding technique, in which the shortest code is assigned to the most frequently used value and the longest code is assigned to the least frequently used value, and the like. Video data may be effectively compressed using these video compression techniques, and may then be transmitted or stored.

Meanwhile, with the increase in demand for high-resolution video, demand for stereoscopic video content, as a new video service, is also increasing. Discussions on video compression techniques for effectively providing high-resolution and super-resolution stereoscopic video content (for example, 3D video) are underway.

DISCLOSURE

Technical Problem

An object of the present invention is to provide a method and device for effectively deriving motion information of a current layer in video encoding and decoding for a multi-layer structure.

Another object of the present invention is to provide a method and device for deriving motion information of a current layer based on motion information of a reference layer in video encoding and decoding for a multi-layer structure.

A further object of the present invention is to provide a method and device for restoring the picture of a current layer using motion information of the current layer in video encoding and decoding for a multi-layer structure, the motion information being derived based on motion information of a reference layer.

Technical Solution

An embodiment of the present invention is a video decoding method and device supporting a multi-layer structure. The video decoding method according to the present invention includes specifying a current layer criterion location that specifies a current block in a current layer; specifying a reference layer criterion location, corresponding to the current layer criterion location, in a reference layer; deriving motion information from the reference layer criterion location based on a size of a motion information storage unit; and scaling the derived motion information and deriving the scaled motion information as a motion vector to be used for reconstructing a picture in the current layer.

Another embodiment of the present invention is a video encoding method and device supporting a multi-layer structure. The video encoding method according to the present invention includes specifying a current layer criterion location that specifies a current block in a current layer; specifying a reference layer criterion location, corresponding to the current layer criterion location, in a reference layer; deriving motion information from the reference layer criterion location based on a size of a motion information storage unit; and scaling the derived motion information and deriving the scaled motion information as a motion vector to be used for reconstructing a picture in the current layer.

Advantageous Effects

According to the present invention, motion information of a current layer may be effectively derived in video encoding and decoding for a multi-layer structure.

According to the present invention, motion information of a current layer may be effectively derived based on motion information of a reference layer in video encoding and decoding for a multi-layer structure.

According to the present invention, the picture of a current layer may be effectively restored using the motion information of a current layer in video encoding and decoding for a multi-layer structure, the motion information of the current layer being derived based on the motion information of a reference layer.

BEST MODE

Figure 1:
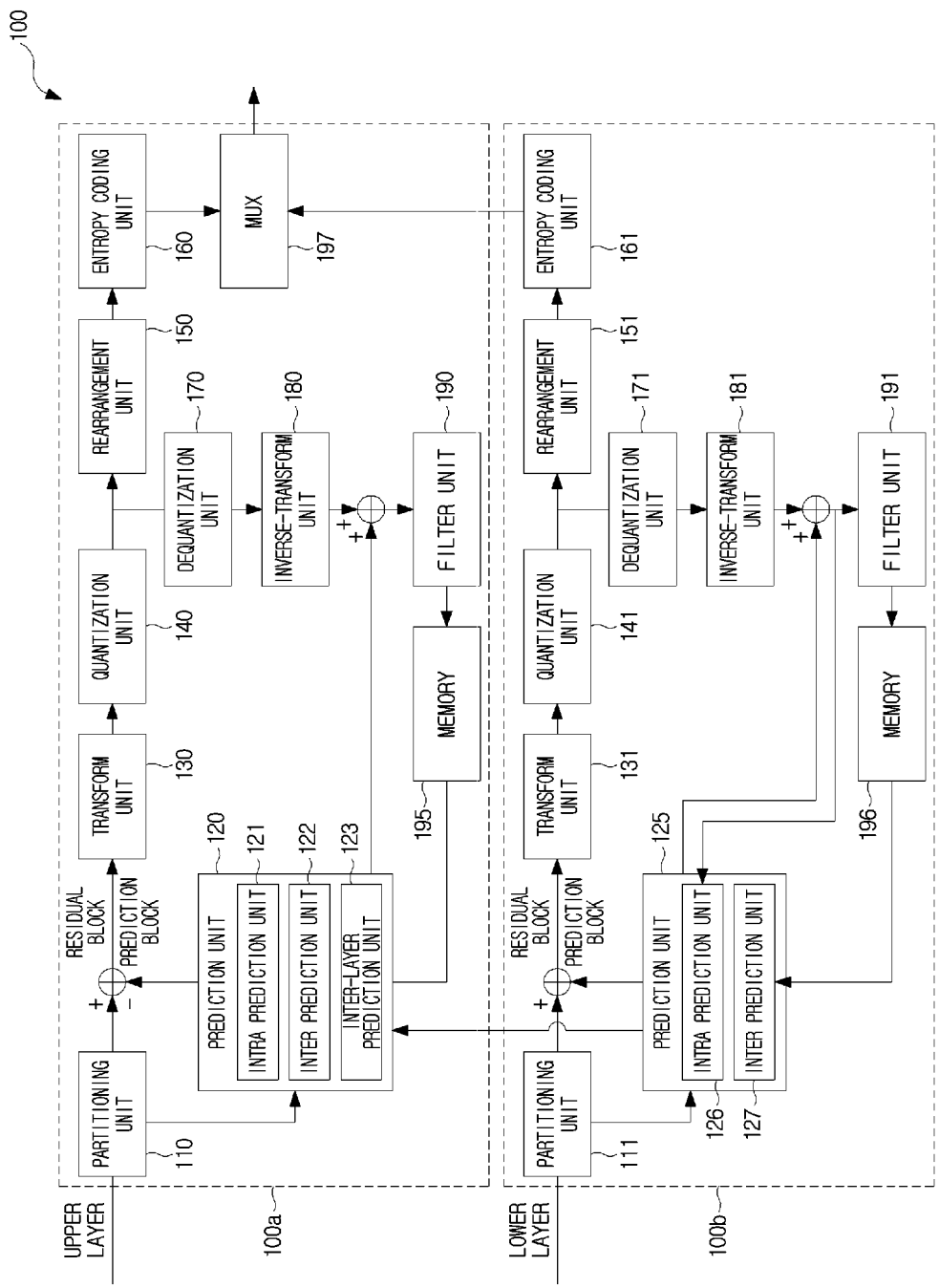
FIG. 1 is a block diagram schematically illustrating an encoding device according to an embodiment of the present invention.

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

In this specification, when it is said that one element is 'connected' or 'coupled' with another element, it may mean that the one element may be directly connected or coupled with the other element and a third element may be 'connected' or 'coupled' between the two elements. Furthermore, in this specification, when it is said that a specific element is 'included', it may mean that elements other than the specific element are not excluded and that additional elements may be included in the embodiments of the present invention or the scope of the technical spirit of the present invention.

Terms such as 'the first' and 'the second' may be used to describe various elements, but the elements are not restricted by the terms. The terms are used only to distinguish one element from the other element. For example, a first element may be named a second element without departing from the scope of the present invention. Likewise, a second element may be named a first element.

Furthermore, element modules described in the embodiments of the present invention are independently shown in order to indicate different and characteristic functions, but this does not mean that each of the element modules is formed of a separate piece of hardware or software. That is, the element modules are arranged and included for convenience of description, and at least two of the element modules may form one element module or one element module may be divided into a plurality of element modules to perform their own functions. An embodiment in which the element modules are integrated and an embodiment in which the element modules are separated are included in the scope of the present invention, unless it departs from the essence of the present invention.

Furthermore, in the present invention, some elements are not essential elements for performing essential functions, but may be optional elements for improving only performance. The present invention may be implemented using only essential elements for implementing the essence of the present invention other than elements used merely to improve performance, and a structure including only essential elements, but not optional elements used only to improve performance, is included in the scope of the present invention.

Video encoding and decoding that supports a multi-layer bitstream is called scalable coding. Because there is a strong correlation between the multiple layers, when prediction is performed using this correlation, duplicate elements may be removed and video encoding performance may be improved. Predicting the current layer, which is the target of prediction, using information about another layer is referred to as inter-layer prediction.

At least one of a resolution, a frame rate, and a color format may be different between the multiple layers, and re-sampling of a layer, such as up-sampling or down-sampling, may be performed in order to adjust the resolution during the inter-layer prediction.

FIG. 1 is a block diagram schematically illustrating an encoding device according to an embodiment of the present invention.

An encoding device 100 according to the present invention includes an encoding unit 100a for an upper layer and an encoding unit 100b for a lower layer.

The upper layer may be called a current layer or an enhancement layer, and the lower layer may be called a reference layer or a base layer. At least one of the resolution, frame rate, and color format may differ between the upper layer and the lower layer. When a change of resolution is required for inter-layer prediction, up-sampling or down-sampling of the layer may be performed.

The encoding unit 100a of the upper layer may include a partitioning unit 110, a prediction unit 100, an intra prediction unit 121, an inter prediction unit 122, an inter-layer prediction unit 123, a transform unit 130, a quantization unit 140, a rearrangement unit 150, an entropy coding unit 160, a dequantization unit 170, an inverse-transform unit 180, a filter unit 190, memory 195, and a MUX 197.

The encoding unit 100b of the lower layer may include a partitioning unit 111, a prediction unit 125, an intra prediction unit 126, an inter prediction unit 127, a transform unit 131, a quantization unit 141, a rearrangement unit 151, an entropy coding unit 161, a dequantization unit 171, an inverse-transform unit 181, a filter unit 191, and memory 196.

The encoding unit may be implemented by a video encoding method described in an embodiment of the present invention, which will be described below, but the operations of some parts may not be performed in order to reduce the complexity of the encoding device or to enable fast real-time encoding. For example, rather than a method in which all intra prediction mode methods are used to select the optimal intra-encoding method, a method in which one is selected from among a limited number of intra prediction modes and the selected one is set as the final intra prediction mode may be performed for real-time encoding when the prediction unit performs intra prediction. In another example, a prediction block used for intra prediction or inter prediction may have a limited form.

The unit of a block processed in the encoding device may be a coding unit for performing coding, a prediction unit for performing prediction, and a transform unit for performing transformation. The coding unit, the prediction unit, and the transform unit may be represented as CU, PU, and TU, respectively.

The partitioning units 110 and 111 may partition a layer by partitioning a layer picture into multiple combinations of coding blocks, prediction blocks, and transform blocks, and by selecting one combination of coding blocks, prediction blocks, and transform blocks based on a predetermined criterion (for example, a cost function). For example, in order to partition a layer picture into coding units, a recursive tree structure such as a QuadTree structure may be used. Hereinafter, in an embodiment of the present invention, a coding block may mean not only a block for encoding but also a block for decoding.

A prediction block may be a unit for performing prediction, such as intra prediction or inter prediction. A block for intra prediction may be a block having the form of a square, such as 2N×2N or N×N. As a block for inter prediction, there are a block in the form of a square, such as 2N×2N and N×N, a block in the form of 2N×N and N×2N, obtained by dividing a prediction block having a square form into two, and a block having an asymmetric form, obtained by a prediction block partitioning method using Asymmetric Motion Partitioning (AMP). The transform unit 115 may use different transform methods according to the form of the prediction block.

The prediction units 120 and 125 of the encoding units 100a and 100b may include intra prediction units 121 and 126 for performing intra prediction and inter prediction units 122 and 126 for performing inter prediction. The prediction unit 120 of the encoding unit 100a for the upper layer further includes an inter-layer prediction unit 123 that performs prediction for the upper layer using the information about the lower layer.

The prediction units 120 and 125 may determine whether to perform intra prediction or inter prediction for a prediction block. The processing unit on which prediction is performed may be different from the unit of the processing block for determining the prediction method. For example, when intra prediction is performed, the prediction mode may be determined based on a prediction block, and the prediction process may be performed based on a transform block. A residual (residual block) between the generated prediction block and the original block may be input to the transform units 130 and 131. Also, the prediction mode information used for prediction, motion vector information, and the like are encoded along with the residual by the entropy coding unit 130, and may be transmitted to the decoding device.

When a Pulse Coded Modulation (PCM) mode is used, the original block may be encoded without performing prediction by the prediction units 120 and 125, and may be transmitted to a decoding unit.

The intra prediction units 121 and 126 may generate an intra-predicted block based on reference pixels located around the current block (the prediction target block). In the intra prediction method, the intra prediction mode may have a directional prediction mode, which uses reference pixel information according to the prediction direction, and a non-directional mode, which does not use direction information when making the prediction. The mode for predicting luma information may be different from the mode for predicting chroma information. Intra prediction mode information, obtained by predicting luma information, or information about the predicted luma signal may be used to predict chroma information. Meanwhile, if the reference pixels are not available, a prediction block may be generated by replacing the unavailable reference pixels with other pixels.

A prediction block may include multiple transform blocks. If the size of a prediction block is the same as the size of a transform block when performing intra prediction, intra prediction for the prediction block may be performed based on a left pixel, an upper-left pixel, and an upper pixel of the prediction block. However, if the size of a prediction block is different from that of a transform block when performing intra prediction and thus the prediction block includes multiple transform blocks, intra prediction may be performed based on reference pixels determined based on the transform block.

The intra prediction method may generate a prediction block after applying a Mode Dependent Intra Smoothing (MDIS) filter to reference pixels according to the intra prediction mode. The types of the MDIS filter applied to the reference pixels may be different. The MDIS filter is an additional filter applied to an intra-predicted block generated by performing intra prediction, and may be used for reducing a residual between reference pixels and the intra-predicted block, generated after performing prediction. When MDIS filtering is performed, different filtering may be performed on reference pixels and on some columns included in the intra-predicted block according to the direction of the intra prediction mode.

The inter prediction units 122 and 127 may perform prediction by referring to the information about a block included in at least one of the picture preceding and the picture following the current picture. The inter prediction units 122 and 127 may include a reference picture interpolation unit, a motion prediction unit, and a motion compensation unit.

The reference picture interpolation unit may be provided with information about a reference picture from the memory 195 or 196, and may generate information about a pixel, which is smaller than an integer pixel, from the reference picture. In the case of a luma pixel, an 8-tap DCT-based Interpolation Filter with a variable filter coefficient may be used to generate information on pixels smaller than an integer pixel in units of ¼ pixel. In the case of a chrominance signal, a 4-tap DCT-based Interpolation Filter with a variable filter coefficient may be used to generate information on pixels smaller than an integer pixel in units of ⅛ pixel.

The inter prediction units 122 and 127 may perform motion prediction based on the reference picture interpolated by the reference picture interpolation unit. In order to obtain a motion vector, various methods, such as a Full search-based Block Matching Algorithm (FBMA), a Three Step Search (TSS) algorithm, a New Three-Step Search (NTSS) algorithm, and the like, may be used. A motion vector may have a motion vector value in units of ½ or ¼ pixel based on the interpolated pixel. The inter prediction units 122 and 127 may perform prediction on the current block by applying one of various inter prediction methods.

As the inter prediction method, various methods, for example, a skip method, a merge method, a method using a Motion Vector Predictor (MVP), etc. may be used.

Motion information in inter prediction, namely, information about the index of a reference picture, a motion vector, a residual signal, and the like, is entropy-coded and transmitted to the decoding unit. When a skip mode is applied, processes for generating, transforming, quantizing, and transmitting a residual may not be performed.

The inter-layer prediction unit 123 performs inter-layer prediction, in which the upper layer is predicted using the information about the lower layer. The inter-layer prediction unit 123 may perform the inter-layer prediction using the motion information, etc. about the lower layer.

The inter-layer prediction sets the picture of the lower layer as a reference picture and performs prediction on the current block of the upper layer using the information about the motion in the picture of the lower layer (reference layer).

The picture of the reference layer, used as a reference picture in the inter-layer prediction, may be a picture that is sampled so as to match the resolution of the current layer.

Also, the motion information may include a motion vector and a reference picture index. In this case, the motion vector value for the picture of the reference layer may be set to 0.

As an example of the inter-layer prediction, a prediction method that uses the picture of a lower layer as a reference picture is described, but the present invention is not limited to this. The inter-layer prediction unit 123 may additionally perform inter-layer texture prediction, inter-layer motion prediction, inter-layer syntax prediction, inter-layer residual prediction, and the like.

The inter-layer texture prediction may derive the texture of the current layer based on the texture of the reference layer. The texture of the reference layer may be sampled to match the resolution of the current layer, and the inter-layer prediction unit 123 may predict the texture of the current layer based on the sampled texture of the reference layer. The inter-layer motion prediction may derive the motion vector of the current layer based on the motion vector of the reference layer. In this case, the motion vector of the reference layer may be scaled to match the resolution of the current layer. The inter-layer syntax prediction may predict the syntax of the current layer based on the syntax of the reference layer. For example, the inter-layer prediction unit 123 may use the syntax of the reference layer as the syntax of the current layer. Also, the inter-layer residual prediction may reconstruct the picture of the current layer using the residual between the restored picture of the reference layer and the restored picture of the current layer.

A residual block, which includes information about a residual, which is the difference between the prediction block generated by the prediction units 120 and 125 and a block reconstructed from the prediction block, is generated, and the residual block is input to the transform units 130 and 131.

The transform units 130 and 131 may transform the residual block using a transform method such as Discrete Cosine Transform (DCT) or Discrete Sine Transform (DST). Whether to apply DCT or DST to transform the residual block may be determined based on the intra prediction mode information about the prediction block, which was used for generating the residual block, and the information about the size of the prediction block. In other words, the transform units 130 and 131 may use different transform methods depending on the size of the prediction block and the prediction method.

The quantization units 140 and 141 may quantize the values that are transformed to a frequency domain by the transform units 130 and 131. The quantization coefficient may change according to the block or the importance of the picture. The values calculated by the quantization units 140 and 141 may be provided to the dequantization units 170 and 17 and the rearrangement units 150 and 151.

The rearrangement units 150 and 151 may rearrange the coefficient values for the quantized residual values. The rearrangement units 150 and 151 may change 2-dimensional block-type coefficients to a one-dimensional vector form through a coefficient scanning method. For example, the rearrangement units 150 and 151 may scan from DC coefficients to coefficients of a high-frequency domain using a zigzag scanning method in order to change the 2-dimensional block-type coefficients to one-dimensional vector form. Depending on the size of the transform block and the intra prediction mode, a vertical scanning method, which scans 2-dimensional block-type coefficients in a vertical direction, and a horizontal scanning method, which scans 2-dimensional block-type coefficients in a horizontal direction, may be used. In other words, depending on the size of the transform block and the intra prediction mode, whether to use the zigzag scanning method, the vertical scanning method, or the horizontal scanning method may be determined.

The entropy coding units 160 and 161 may perform entropy coding based on the values calculated by the rearrangement units 150 and 151. Entropy coding may use various coding methods, for example, Exponential-Golomb coding, Context-Adaptive Variable Length Coding (CAVLC), and Context-Adaptive Binary Arithmetic Coding (CABAC).

The entropy coding units 160 and 161 may perform entropy coding based on a predetermined coding method by receiving various information, such as residual coefficient information and block type information of a coding block, prediction mode information, partition unit information, prediction block information and transmission unit information, motion vector information, reference frame information, interpolation information for a block, filtering information, and the like, from the rearrangement units 150 and 151 and the prediction units 120 and 125. Also, the entropy coding units 160 and 161 may entropy-code the coefficient value of a coding unit, input from the rearrangement units 150 and 151.

The entropy coding units 160 and 161 may encode the intra prediction mode information of the current block by binary-coding the intra prediction mode information. The entropy coding units 160 and 161 may include a codeword mapping unit for the binary coding, and may perform the binary coding differently depending on the size of the prediction block for intra prediction. The codeword mapping unit may adaptively generate a codeword mapping table through a binary coding operation, or may have a previously generated mapping table. In another embodiment, the entropy coding units 160 and 161 may represent the intra prediction mode information about the current block using a code-num mapping unit for performing code-num mapping and a codeword mapping unit for performing codeword mapping. The code-num mapping unit and the codeword mapping unit may generate a code-num mapping table and a codeword mapping table, respectively, or may respectively have a previously generated code-num mapping table and codeword mapping table.

The dequantization units 170 and 171 dequantize the values quantized by the quantization units 140 and 141, and the inverse-transform units 180 and 181 inverse-transform the values transformed by the transform units 130 and 131. The residual generated by the dequantization units 170 and 171 and the inverse-transform units 180 and 181 is combined with the prediction block, which was predicted by the motion prediction unit, the motion compensation unit, and the intra prediction unit included in the prediction units 120 and 125, whereby a reconstructed block may be generated.

The filter units 190 and 191 may include at least one of a deblocking filter and an offset correction unit.

The deblocking filter may remove block distortion, generated due to the boundaries between blocks, in the reconstructed picture. Whether to perform deblocking, namely, whether to apply the deblocking filter to the current block, may be determined based on the pixels included in some rows or columns of the block. When the deblocking filter is applied to a block, a strong filter or a weak filter may be applied according to the required strength of deblocking filtering. Also, in applying the deblocking filter, when vertical filtering and horizontal filtering are performed, the vertical filtering and the horizontal filtering may be processed concurrently.

The offset correction unit may correct an offset between the picture on which deblocking is performed and the original picture in pixel units. In order to perform the offset correction on a specific picture, a method in which the pixels included in the picture are divided into a certain number of areas, the area to which an offset is to be applied is determined, and the offset is applied to the area may be used, or a method in which the offset is applied in consideration of the information about the edge of each pixel may be used.

The filter units 190 and 191 may apply only the deblocking filter, or may apply both the deblocking filter and offset correction.

The memory 195 and 196 may store the reconstructed block or pictures calculated by the filter units 190 and 191, and the reconstructed block and pictures stored in the memory may be provided to the prediction units 120 and 125 when intra prediction is performed.

Information output from the entropy coding unit 100b of the lower layer and information output from the entropy coding unit 100a of the upper layer are multiplexed by the MUX 197, and may then be output in the form of a bitstream.

The MUX 197 may be included in the encoding unit 100b of the lower layer, or may be implemented as a separate device or module, unlike the encoding unit 100.

Figure 2:
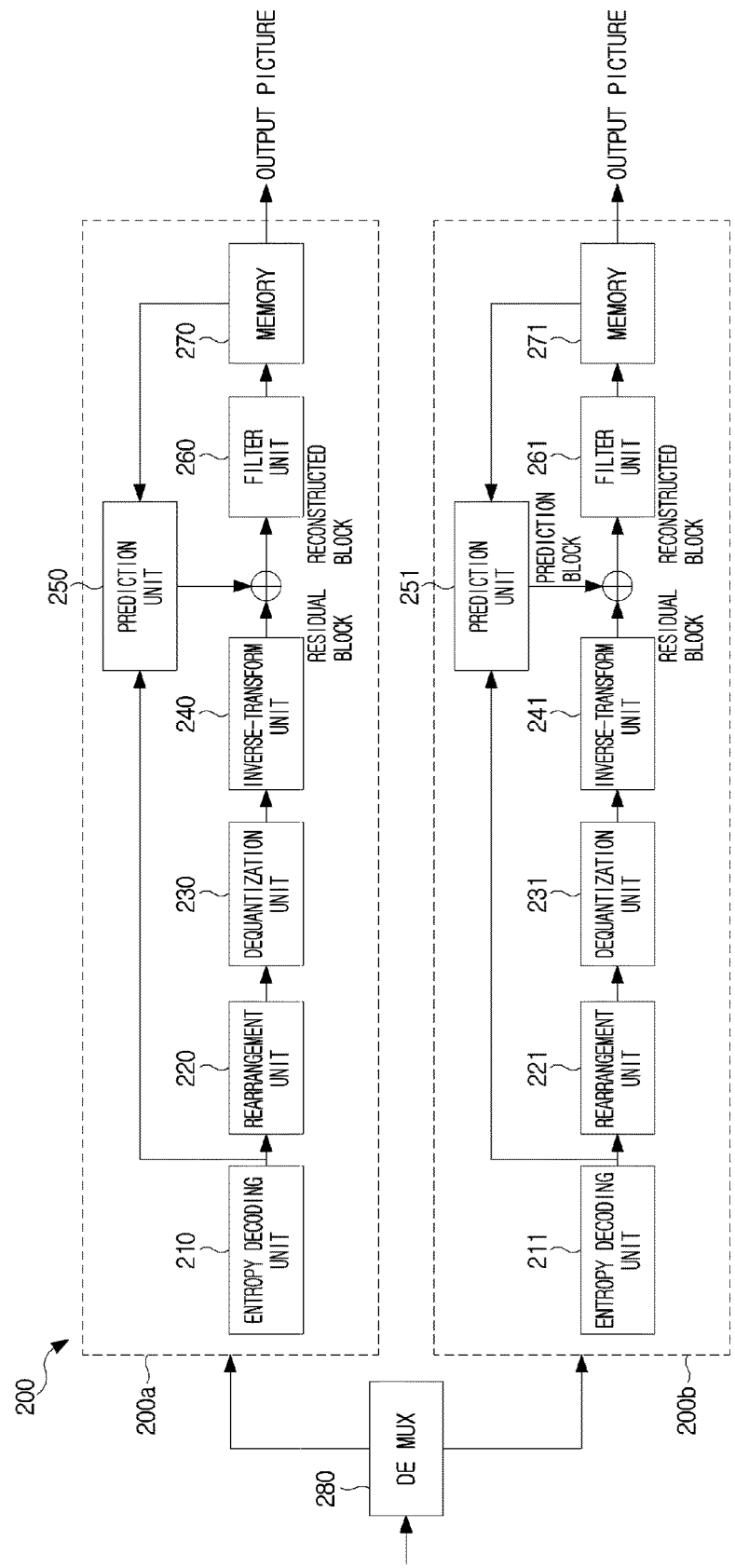
FIG. 2 is a block diagram schematically illustrating a decoding device according to an embodiment of the present invention.

FIG. 2 is a block diagram schematically illustrating a decoding device according to an embodiment of the present invention.

As illustrated in FIG. 2, a decoding device 200 includes a decoding unit 200a of an upper layer and a decoding unit 200b of a lower layer.

The decoding unit 200a of the upper layer may include an entropy decoding unit 210, a rearrangement unit 220, a dequantization unit 230, an inverse-transform unit 240, a prediction unit 250, a filter unit 260, and memory 270.

The decoding unit 200b of the lower layer may include an entropy decoding unit 211, a rearrangement unit 221, a dequantization unit 231, an inverse-transform unit 241, a prediction unit 251, a filter unit 261, and memory 271.

When a bitstream including multiple layers is transmitted from the encoding device, a DEMUX 280 demultiplexes the information according to each of the layers and transmits it to the decoding unit 200a or 200b of each of the layers. The input bitstream may be decoded through a process that is the inverse of the process of the encoding device.

The entropy decoding units 210 and 211 may perform entropy-decoding through the inverse of the entropy-coding process performed by the entropy coding unit of the encoding device. Among the pieces of information decoded by the entropy decoding units 210 and 211, information for generating a prediction block is provided to the prediction units 250 and 251, and a residual, entropy-decoded by the entropy decoding unit, may be input to the rearrangement units 220 and 221.

The entropy decoding units 210 and 211 may perform inverse transform by using at least one of CABAC and CAVLC, like the entropy coding units 160 and 161.

The entropy decoding units 210 and 211 may decode information about intra prediction and inter prediction performed by the encoding device. The entropy decoding unit includes a codeword mapping unit that has a codeword mapping table for generating an intra prediction mode number from a received codeword. The codeword mapping table may be stored in advance, or may be generated adaptively. When a code-num mapping table is used, a code-num mapping unit for performing code-num mapping may be additionally arranged.

The rearrangement units 220 and 221 may rearrange the bitstream, entropy-decoded by the entropy decoding units 210 and 211, based on the arrangement method used by the encoding unit. The coefficients, represented in one-dimensional vector form, may be rearranged as 2-dimensional block-type coefficients by being reconstructed. The rearrangement unit receives the information about the coefficient scanning method performed by the encoding unit, and may rearrange the coefficients using a method in which inverse scanning is performed based on the sequence of scanning performed by the encoding unit.

The dequantization units 230 and 231 may perform dequantization based on the quantization parameter provided by the encoding device and the rearranged coefficients of the block.

The inverse-transform units 240 and 241 may perform inverse DCT and inverse DST, which correspond to DCT and DST performed by the transform units 130 and 131, on the result of quantization performed by the encoding device. The inverse-transform may be performed in transmission units determined by the encoding device. In the transform unit of the encoding device, DCT and DST may be selectively performed according to multiple pieces of information, such as the prediction method, the size of the current block, the prediction direction, and the like. The inverse-transform unit 225 may perform inverse transform based on the information about the transform performed by the transform unit of the encoding device. Transform may be performed based on a coding block rather than a transform block.

The prediction units 250 and 251 may generate a prediction block based on information about the generation of the prediction block, provided by the entropy decoding units 210 and 211, and information about previously decoded blocks or pictures, provided from the memory 270 and 271.

The prediction units 250 and 251 may include a prediction unit determination unit, an inter prediction unit, and an intra prediction unit.

The prediction unit determination unit receives various information, including prediction unit information input from the entropy decoding unit, prediction mode information about an intra prediction method, motion prediction information about an inter prediction method, and the like, separates a prediction block from a current coding block, and determines whether the prediction block performs intra prediction or inter prediction.

The inter prediction unit may perform inter prediction for the current prediction block based on information included in at least one of the picture preceding and the picture following the current picture that includes the current prediction block, using information required for inter prediction of the current prediction block provided by the encoding device. In order to perform inter prediction, it may be determined whether the method used as the motion prediction method of the prediction block included in the coding block based on the corresponding coding block is a skip mode, a merge mode, or a AMVP mode using a motion vector predictor (MVP).

The intra prediction unit may generate a prediction block based on information about pixels in the current picture. When the prediction block is a prediction block on which intra prediction is performed, intra prediction may be performed based on the intra prediction mode information about the prediction block, provided by the encoding device. The intra prediction unit may include an MDIS filter for performing filtering on reference pixels of the current block, a reference pixel interpolation unit for generating reference pixels in units smaller than a single pixel by interpolating the reference pixels, and a DC filter for generating a prediction block through filtering when the prediction mode of the current block is a DC mode.

The prediction unit 250 of the decoding unit 200a of the upper layer may further include an inter-layer prediction unit for performing inter-layer prediction, in which the upper layer is predicted using information about the lower layer.

The inter-layer prediction unit may perform inter-layer prediction using the intra prediction mode information, motion information, and the like.

The inter-layer prediction sets the picture of the lower layer as a reference picture and performs prediction on the current block of the upper layer using the motion information of the picture of the lower layer (reference layer).

The picture of the reference layer, used as a reference picture in the inter-layer prediction, may be a picture that is sampled to match the resolution of the current layer. Also, the motion information may include a motion vector and a reference picture index. In this case, the motion vector value for the picture of the reference layer may be set to 0.

As an example of the inter-layer prediction, a prediction method that uses the picture of a lower layer as a reference picture is described, but the present invention is not limited to this. The inter-layer prediction unit 123 may additionally perform inter-layer texture prediction, inter-layer motion prediction, inter-layer syntax prediction, inter-layer residual prediction, and the like.

The inter-layer texture prediction may derive the texture of the current layer based on the texture of the reference layer. The texture of the reference layer may be sampled to match the resolution of the current layer, and the inter-layer prediction unit may predict the texture of the current layer based on the sampled texture of the reference layer. The inter-layer motion prediction may derive the motion vector of the current layer based on the motion vector of the reference layer. In this case, the motion vector of the reference layer may be scaled to match the resolution of the current layer. The inter-layer syntax prediction may predict the syntax of the current layer based on the syntax of the reference layer. For example, the inter-layer prediction unit 123 may use the syntax of the reference layer as the syntax of the current layer. Also, the inter-layer residual prediction may reconstruct the picture of the current layer using the residual between the restored picture of the reference layer and the restored picture of the current layer.

The reconstructed block or picture may be provided to the filter units 260 and 261. The filter units 260 and 261 may include a deblocking filter and an offset correction unit.

The encoding device may provide information about whether a deblocking filter is applied to the corresponding block or picture and information indicating that the filter is a strong filter or a weak filter when the deblocking filter is applied. The deblocking filter of the decoding device receives information about the deblocking filter provided by the encoding device, and the decoding device may perform deblocking filtering on the corresponding block.

The offset correction unit may perform offset correction on the reconstructed picture based on the type of offset correction applied to the picture during encoding and information about the offset value.

The memory 270 and 271 may store the reconstructed picture or block to be used as a reference picture or a reference block, and may output the reconstructed picture.

The encoding device and decoding device may perform encoding on three or more layers rather than two layers, in which case the encoding unit of the upper layer and the decoding unit of the upper layer may comprise multiple encoding units and decoding units corresponding in number to the number of upper layers.

In Scalable Video Coding (SVC), supporting a multi-layer structure, there is a correlation between multiple layers. When prediction is performed using this correlation, duplicate elements may be removed and video encoding performance may be improved.

Therefore, when the encoded or decoded picture of the current layer (enhancement layer) is predicted, not only inter prediction or intra prediction using the information on the current layer but also inter-layer prediction using the information on another layer may be performed.

When inter-layer prediction is performed, the current layer may generate a prediction sample of the current layer using the decoded picture of the reference layer, which is used for inter-layer prediction, as a reference picture.

In this case, because at least one of the resolution, frame rate, color format, and viewpoint may differ between the current layer and the reference layer (due to the difference in scalability between the layers), the decoded picture of the reference layer is resampled to be adapted to the scalability of the current layer, and may then be used as the reference picture for the inter-layer prediction of the current layer. "Resampling" means up-sampling or down-sampling the samples of the reference layer picture to match the size of the current layer picture.

In this specification, the current layer is the layer on which encoding or decoding is performed, and may be an enhancement layer or an upper layer. The reference layer is the layer that is referred to for inter-layer prediction of the current layer, and may be a base layer or a lower layer. The picture of the reference layer (that is, the reference picture) used for inter-layer prediction of the current layer may be called an inter-layer reference picture.

In scalable video coding, motion information of the reference layer (base layer) may be used when a candidate for merge modes to be applied to the current layer is derived or when a candidate for modes for predicting motion information (mode using MVP) is derived. In this case, it is necessary to consider that the resolution of the current layer is different from that of the reference layer and the motion information of the reference layer is stored in predetermined units. In other words, it is necessary to determine the location on the base layer from which the motion information is derived, in order to apply the motion information to the target block of the current layer.

The process in which motion information is derived from the base layer and applied to a prediction unit of the current layer is simply described as follows:

(1) specifying a current layer criterion location that specifies a current block (for example, PU) in the current layer (2) specifying a reference layer criterion location, which corresponds to the current layer criterion location, in the reference layer (3) deriving motion information from the reference layer criterion location, considering the size of units for storing the motion information (for example, motion vector)

(4) scaling the derived motion information (for example, motion vector) to be used as motion information of the current layer.

Rather than configuring the pieces of motion information of the neighboring block used as merge candidates in the merge mode to be similar to each other or rather than configuring the motion vectors of the block used as candidates in the mode using a MVP to be similar to each other, using various motion information and various motion vectors as candidates may improve prediction efficiency. Therefore, in order to derive various motion information from the base layer, a location specifying the block of the current layer is properly selected, and based on this, prediction for the current layer may be performed.

Hereinafter, according to the present invention, a method for specifying a criterion location of the current layer and a criterion location of the reference layer and a method in which the motion information of the reference layer is derived based on the criterion locations and is used as motion information of the current layer are described in detail.

Figure 3:
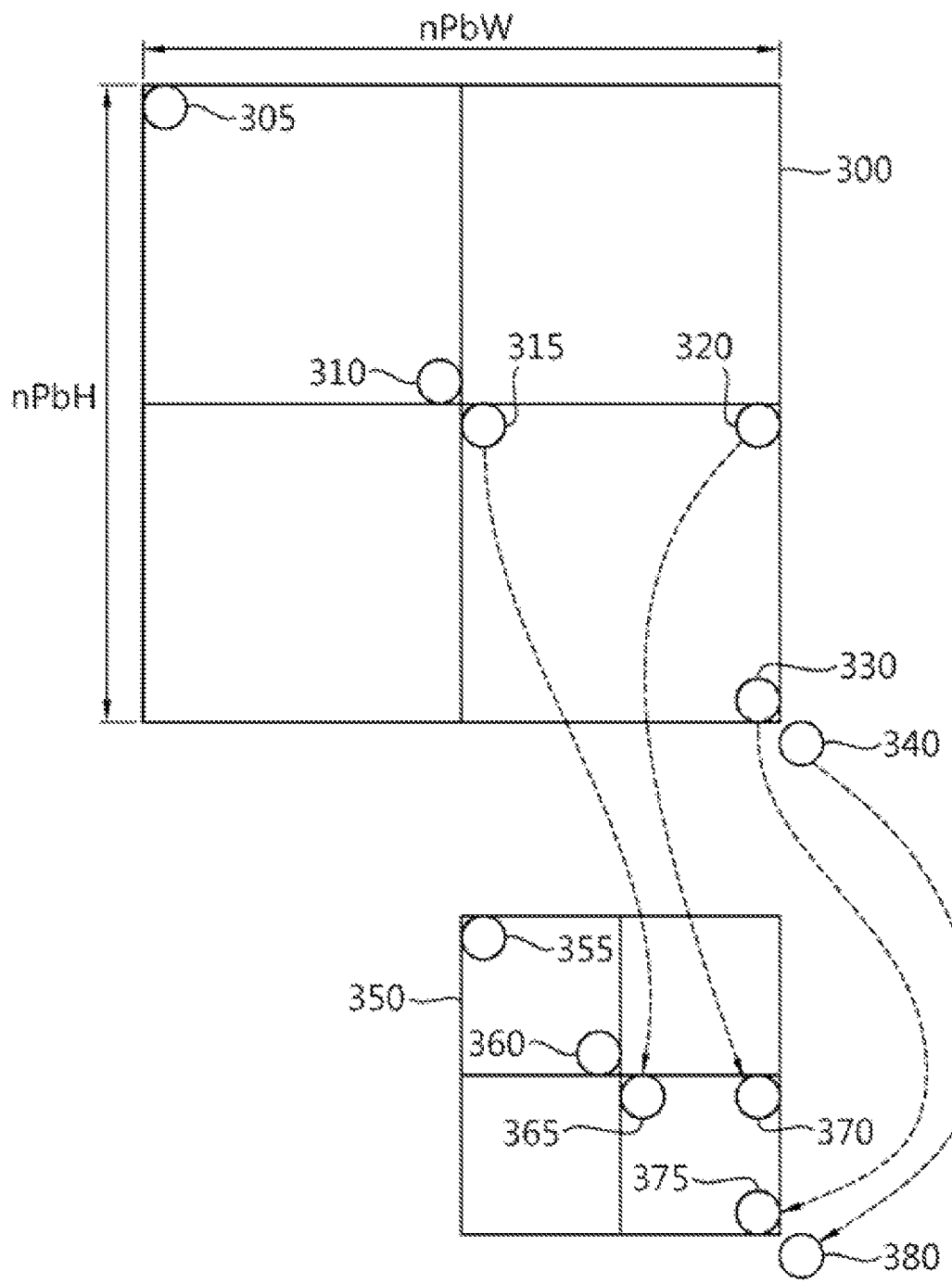
FIG. 3 is a view schematically explaining a method for specifying a sample location on a base layer corresponding to that of an enhancement layer, according to the present invention.

(1) Specifying a Current Layer Criterion Location that Specifies a Current Block (for Example, PU) in the Current Layer FIG. 3 is a view schematically explaining a method for specifying a sample location of a base layer corresponding to a sample location of an enhancement layer, according to the present invention.

Referring to FIG. 3, a location for specifying the block of a current layer (for example, a prediction block), there are the location of a top-left sample 305 of a block 300, the location of an upper-left sample 310 of the center of the block 300, the location of a lower-right sample 315 of the center of the block 300, the location of a top-right sample 320 of the lower-right partition of the block 300, the location of a bottom-right sample 330 of the block 300, and the location of a sample 340 adjacent to the lower-right corner of the block 300, and any one selected from among these locations may be used as a location for specifying the block 300 of the current layer.

Suppose that the location of the top-left sample of the block 300 in the current layer is (xP, yP) based on the upper-left corner of the current picture, the width of the block 300 of the current layer is $nPbW_C$, and the height thereof is $nPbH_C$.

In the block 300 of the current layer, the location ($xP_{LA}$, $yP_{LA}$) of the top-left sample 305 may be specified as Equation 1.

$$xP_{LA}=xP$$

$$yP_{LA}=yP \qquad \text{<Equation 1>}$$

In the block 300 of the current layer, the location ($xP_{CL}$, $yP_{CL}$) of the upper-left sample 310 of the center may be specified as Equation 2.

$$xP_{CL}=xP+nPbW_C\!\!>\!\!>\!1-1$$

$$yP_{CL}=yP+nPbH_C\!\!>\!\!>\!1-1 \qquad \text{<Equation 2>}$$

In the block 300 of the current layer, the location ($xP_{CR}$, $yP_{CR}$) of the lower-right sample 315 of the center may be specified as Equation 3.

$$xP_{CR}=xP+nPbW_C\!\!>\!\!>\!1$$

$$yP_{CR}=yP+nPbH_C\!\!>\!\!>\!1 \qquad \text{<Equation 3>}$$

In the block 300 of the current layer, the location ($xP_{PR}$, $yP_{PR}$) of the top-right sample 320 of the lower-right partition may be specified as Equation 4.

$$xP_{PR}=xP+(nPbW_C-1)$$

$$yP_{PR}=yP+nPbH_C\!\!>\!\!>\!1 \qquad \text{<Equation 4>}$$

In the block 300 of the current layer, the location ($xP_{BR}$, $yP_{BR}$) of the bottom-right sample 330 may be specified as Equation 5.

$$xP_{BR}=xP+nPbW_C-1$$

$$yP_{BR}=yP+nPbH_C-1 \qquad \text{<Equation 5>}$$

In the block 300 of the current layer, the location ($xP_H$, $yP_H$) of the sample 340 adjacent to the lower-right corner may be specified as Equation 6.

$$xP_{LA}=xP+nPbW_C$$

$$yP_{LA}=yP+nPbH_C \qquad \text{<Equation 6>}$$

An encoder and a decoder may specify the block using any one of the above-mentioned predetermined locations in the block of the current layer.

For example, the encoder and the decoder may use the location of a sample in the center of the encoding/decoding target block (hereinafter, referred to as a current block) in the current layer as the location of the sample specifying the current block. In other words, if the current block is a prediction block with 16×16 size, the location of the sample specifying the current block may be (xP+8, yP+8).

(2) Specifying a Reference Layer Criterion Location, which Corresponds to the Current Layer Criterion Location, in the Reference Layer After specifying the location of the current block, the criterion location of the reference layer corresponding to the location specifying the current block may be specified. In this case, a picture in which the criterion location of the reference layer is specified, that is, the picture of the reference layer from which the motion vector to be applied to the current block is derived, may be included in an Access Unit (AU) in which the picture of the current layer (current picture) including the current block is included.

The encoder and the decoder may use the ratio of the size (the ratio of resolution) between the current layer (enhancement layer) and the reference layer (base layer) in order to specify a location in the reference layer corresponding to the location of the current block.

Suppose that the width of the picture of the reference layer is PicWRL and the height of the picture of the reference layer is PicHRL.

As mentioned above, when the location of the sample specifying the block of the current layer is (xP, yP), the location (xRef, yRef) of the reference layer corresponding to (xP, yP) may be specified as Equation 7.

$$xRef=(xP*PicWRL+scaledW/2)/scaledW$$

$$yRef=(yP*picHRL+scaledH/2)/scaledH \qquad \text{<Equation 7>}$$

Here, scaledW is a value obtained by multiplying the width of the picture of the reference layer (base layer) by a scalability ratio, and scaledH is a value obtained by multiplying the height of the picture of the reference layer (base layer) by the scalability ratio. The scalability ratio is the ratio of the resolution of the current layer to the resolution of the reference layer, namely, the resolution of the current layer (enhancement layer)/the resolution of the reference layer (base layer).

Therefore, referring to Equation 7, it is confirmed that (xRef, yRef) is the ratio between the location of the sample specifying the block of the current layer and the scalability ratio.

When the scalability ratio between the reference layer and the current layer is 2 (i.e. the ratio of resolution is 2), the value of scaledW is 2PicWRL and the value of scaledH is 2PicWRH. Also, when the scalability ratio between the reference layer and the current layer is 1.5 (for example, the ratio of resolution is 1.5), the value of scaledW is 1.5PicWRL and the value of scaledH is 1.5PicWRH.

Meanwhile, unlike Equation 7, the location (xRef, yRef) of the reference layer corresponding to the sample location (xP, yP) specifying the current block may be derived as Equation 8 by using a shift operation instead of a division operation and applying a scaling factor instead of the specific size of the picture.

$$xRef=((xP)*scaledFactorX+(1<<(shiftX-1)))>>shiftX$$

$$yRef=((yP)*scaledFactorY+(1<<(shiftY-1)))>>shiftY \quad <\text{Equation 8}>$$

Here, scaledFactorX, scaledFactorY, shiftX, and shiftY may be defined as Equation 9, considering the bit depth and/or the units of motion information storage.

$$shiftX=shiftY=16$$

$$scaledFactorX=((PicWRL<<shiftX)+(scaledW>>1))/scaledW$$

$$scaledFactorY=((PicHRL<<shiftY)+(scaledH>>1))/scaledH \quad <\text{Equation 9}>$$

The encoder and the decoder may derive the location of the reference layer corresponding to the location of the sample specifying the current block using Equations 7 to 9.

For example, referring to FIG. 3 again, the encoder and the decoder may derive the location of a sample 355 of the reference layer corresponding to the sample 305 of the current layer, the location of a sample 360 of the reference layer corresponding to the sample 310 of the current layer, the location of a sample 365 of the reference layer corresponding to the sample 315 of the current layer, the location of a sample 370 of the reference layer corresponding to the sample 320 of the current layer, the location of a sample 375 of the reference layer corresponding to the sample 330 of the current layer, and the location of a sample 380 of the reference layer corresponding to the sample 340 of the current layer using Equations 1 to 6 and Equation 7 or Equation 8.

(3) Deriving Motion Information from the Reference Layer Criterion Location, Considering the Size of a Storage Unit of the Motion Information (for Example, Motion Vector)

In the reference layer (base layer), a motion vector is stored in a block unit with a predetermined size (motion vector storage unit) to reduce the required memory (buffer) size. For example, the motion vector may be stored in block units with a 16×16 size.

As described above, in a multi-layer structure, the motion vector to be applied to the current layer may be derived from the reference layer. For example, a predetermined location in the current layer (the location of the current block) is specified as described in (1), and the location of the reference layer corresponding to the location of the current block is specified as described in (2), whereby a motion vector may be derived from the motion vector storage unit (for example, 16×16 block) corresponding to the location induced in (2).

Therefore, in order to derive a motion vector from the reference layer, it is necessary to consider the location on the reference layer that corresponds to the location of the sample specifying the block of the current layer (current block), and the size of a block unit for storing a motion vector in the reference layer.

Suppose that the location specifying a block unit for storing a motion vector (motion vector storage unit) in the reference layer is (xRef0, yRef0). In this specification, the location (xRef0, yRef0) is called a motion vector storage location of the reference layer for convenience of description.

In a multi-layer structure, in order to specify the motion vector storage location of the reference layer with respect to the location of a sample specifying the current block, it is necessary to consider the size of the motion vector storage unit and the location of the sample derived through (1) and (2).

Suppose that the location of a sample specifying the current block in the current layer (for example, current prediction block) is (xP, yP) as described above and the location on the reference layer corresponding to (xP, yP) is (xRef, yRef).

In this case, (xP, yP) may be one among $(xP_{LA}, yP_{LA})$, $(xP_{CL}, yP_{CL})$, $(xP_{CR}, yP_{CR})$, $(xP_{PR}, yP_{PR})$, $(xP_{BR}, yP_{BR})$, and $(xP_{LA}, yP_{LA})$, which are specified by Equations 1 to 6. Also, (xRef, yRef) may be specified by Equation 7 or 8.

If the motion vector storage unit is a 16×16 block, the location (xRef0, yRef0) at which the motion vector is stored may be derived as Equation 10.

$$xRef0=(xRef>>4)<<4$$

$$yRef0=(yRef>>4)<<4 \quad <\text{Equation 10}>$$

Figure 4:
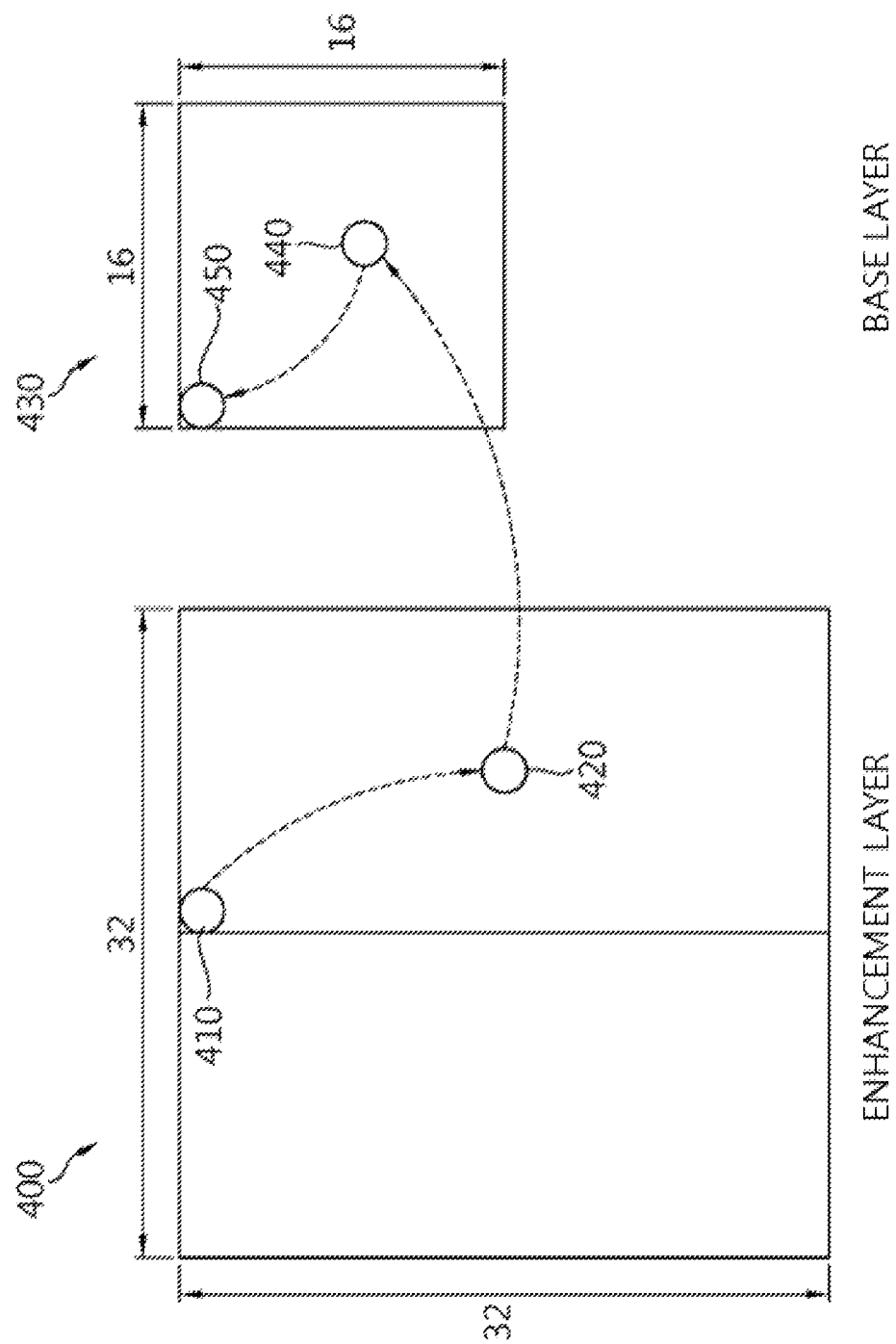
FIG. 4 is a view schematically explaining a method for deriving a location at which a motion vector is stored, according to an example of the present invention.

FIG. 4 is a view schematically explaining a method for deriving the location at which a motion vector is stored, according to an example of the present invention. In the example of FIG. 4, the case in which the size of the coding block 400 of the enhancement layer is 32×32 and the size of the corresponding block 430 of the base layer is 16×16 is described.

In the example of FIG. 4, suppose that the second partition of the coding block 400 of the current layer (enhancement layer) is the current block and the location of a top-left sample 410 of the current block is (xPb, yPb). In this case, if the location of a sample specifying the current block is the location of a sample 420 in the center of the current block, the location (xPCtr, yPCtr) of the sample 420 specifying the current block may be derived as Equation 11.

$$xPCtr=xPb+nPbW/2=xPb+8$$

$$yPCtr=yPb+nPbH/2=yPb+16 \quad <\text{Equation 11}>$$

In Equation 11, nPbW denotes the width of the current block and nPbH denotes the height of the current block.

When the location of the sample specifying the current block is determined as Equation 11, the location of a sample 440 of a reference layer (base layer) corresponding thereto may be derived as Equation 12.

$$xRef=(xPCtr*PicWRL+ScaledW/2)/ScaledW$$

$$yRef=(yPCtr*PicHRL+ScaledH/2)/ScaledH \quad <\text{Equation 12}>$$

In Equation 12, scaledW is a value obtained by multiplying the width of the picture of the reference layer (base layer) by the scalability ratio, and scaledH is a value obtained by multiplying the height of the picture of the reference layer (base layer) by the scalability ratio. The scalability ratio is the ratio of the resolution of the current layer to the resolution of the reference layer.

Based on (xRef, yRef), the motion vector storage location 450 of the base layer corresponding to the current block, namely, (xRef0, yRef0) may be derived as Equation 13 (Equation 10).

$$xRef0=(xRef>>4)<<4$$

$$yRef0=(yRef>>4)<<4 \quad <\text{Equation 13}>$$

Meanwhile, as described above, the motion vector of the reference layer (base layer) is stored according to the motion vector storage unit having the size of 16×16, which is specified by the location of the sample in the upper-left corner.

With respect to this, it is more effective to use various motion vectors as merge candidates or MVP candidates to improve coding performance.

For example, the location of a sample specifying the current block is set to be one of the various locations derived in (1), and the location of the top-left sample of the 16×16 block corresponding to the set location may be found, whereby the motion vector of the corresponding location may be derived as the motion vector of the reference layer corresponding to the current block.

Therefore, unlike Equation 10, as another example for deriving the motion vector storage unit, the location specifying the motion vector storage unit may be derived by applying an offset that reflects the difference between the location specifying the motion vector storage unit and the location of a sample in the reference layer that corresponds to the location of a sample specifying the current block.

When the motion vector storage unit is 16×16 and an offset value is f, the location (xRef0, yRef0) specifying the motion vector storage unit (namely, the location at which the motion vector is stored) may be derived as Equation 14.

$$xRef0=((xRef+f)>>4)<<4$$

$$yRef0=((yRef+f)>>4)<<4 \qquad \text{<Equation 14>}$$

Here, the offset f may be a value denoting the phase of the sample value of the reference layer. For example, if the motion vector of the reference layer is ⅛ pixel unit and the resolution of the current layer is twice the resolution of the reference layer, f may have an integer value in the range of 0 to 15.

For clear understanding of the present invention, the case in which the location of a sample specifying the current block is the location of the sample in the center of the current block will be considered as an embodiment in which the location specifying the motion vector storage unit of the base layer is derived from the location of a sample specifying the current block by applying an offset.

When the current block is a 16×16 block and the location of the top-left sample of the current block is (xP, yP), the location (x, y) of the sample specifying the current block may be derived as (xP+8, yP+8) by Equation 3.

In this case, if the ratio of the resolution between the current layer and the reference layer is 2, the offset value f becomes 4 and the location of the motion vector storage unit in the reference layer may be specified by Equation 15.

$$xRef0=((xRef+4)>>4)<<4$$

$$yRef0=((yRef+4)>>4)<<4 \qquad \text{<Equation 15>}$$

Referring to the drawings, this will be described in detail.

Figure 5:
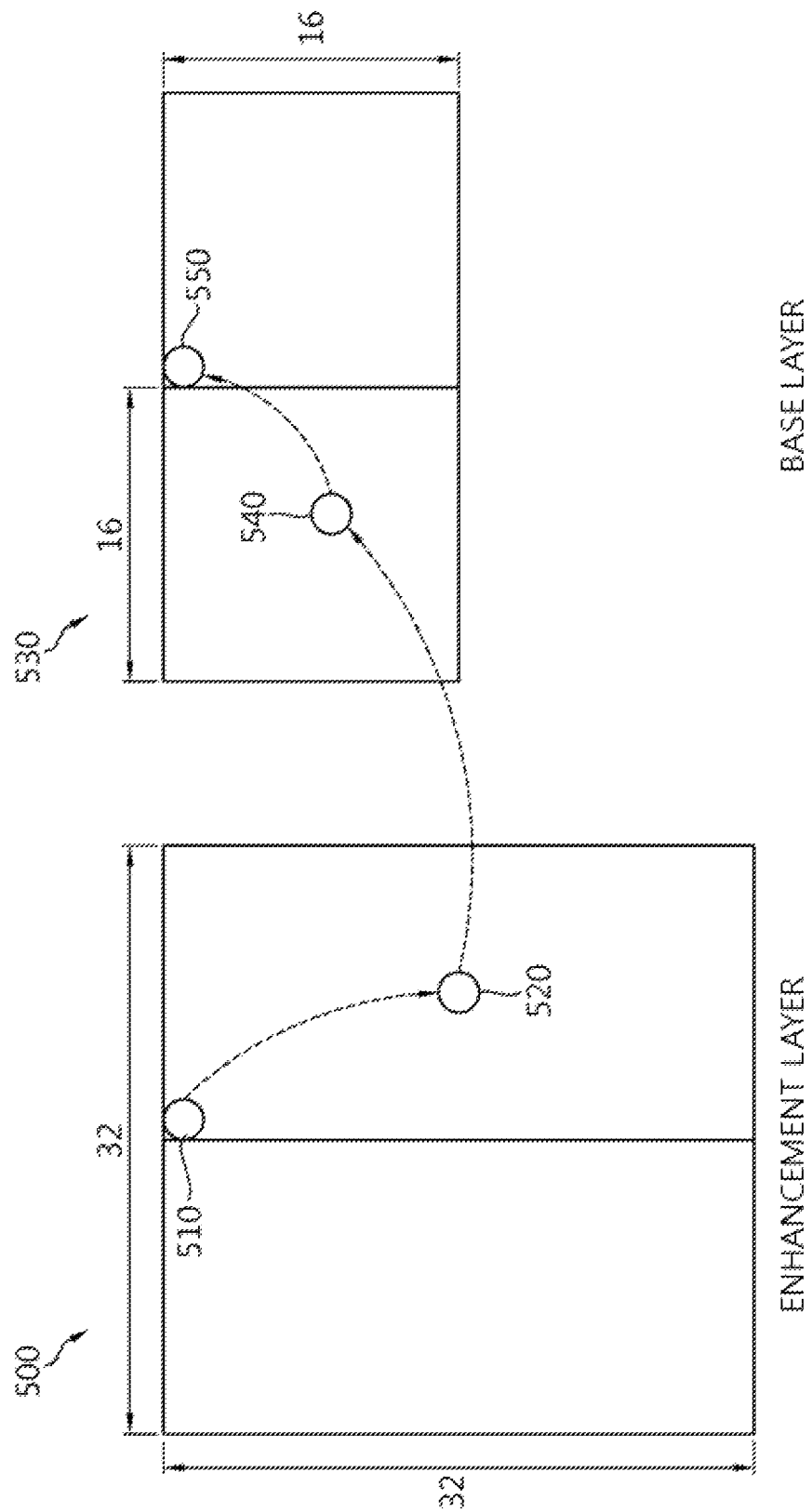
FIG. 5 is a view schematically explaining a method for deriving a location at which a motion vector is stored, according to another example of the present invention.

FIG. 5 is a view schematically explaining a method for deriving the location at which a motion vector is stored according to another example of the present invention. In the example of FIG. 5, the case in which the size of a coding block 500 of an enhancement layer is 32×32 and the size of a corresponding block of a base layer is 16×16 is described.

In the example of FIG. 5, suppose that the second partition of the coding block 500 of the current layer (enhancement layer) is the current block and the location of a top-left sample 510 of the current block is (xPb, yPb). In this case, when the location of a sample specifying the current block is the location of a sample 520 in the center of the current block, the location (xPCtr, yPCtr) of the sample 520 specifying the current block may be derived as Equation 16.

$$xPCtr=xPb+nPbW/2=xPb+8$$

$$yPCtr=yPb+nPbH/2=yPb+8 \qquad \text{<Equation 16>}$$

In Equation 16, nPbW denotes the width of the current block, and nPbH denotes the height of the current block.

When the location of a sample specifying the current block is determined as Equation 16, the location of a sample 540 of the reference layer (base layer) corresponding to this may be derived as Equation 17.

$$xRef=(xPCtr*PicWRL+ScaledW/2)/ScaledW$$

$$yRef=(yPCtr*PicHRL+ScaledH/2)/ScaledH \qquad \text{<Equation 17>}$$

In Equation 17, scaledW is a value obtained by multiplying the width of the picture of the reference layer (base layer) by the scalability ratio and scaledH is a value obtained by multiplying the height of the picture of the reference layer by the scalability ratio. The scalability ratio is the ratio of the resolution of the current layer to that of the reference layer.

Based on (xRef, yRef), the motion vector storage location 550 of the base layer corresponding to the current block, namely, (xRef0, yRef0) may be derived as Equation 18.

$$xRef0=((xRef+4)>>4)<<4$$

$$yRef0=((yRef+4)>>4)<<4 \qquad \text{<Equation 18>}$$

As illustrated in the drawing, when the offset is applied, the motion vector to be applied to the current block may be derived from the neighboring block of the block (collocated block) that corresponds to the current block in the base layer.

In other words, when Equation 14 is used instead of Equation 10, the motion vector storage unit may be derived from the neighboring block of a block of the reference layer corresponding to the current block.

Therefore, as another example for deriving the motion vector storage unit, Equation 10 and Equation 14 may be selectively used in consideration of the memory capacity and the like. For example, when the location derived by Equation 14 and the location derived by Equation 10 are included in a different Largest Coding Unit (LCU), Equation 13 may be applied.

Figure 6:
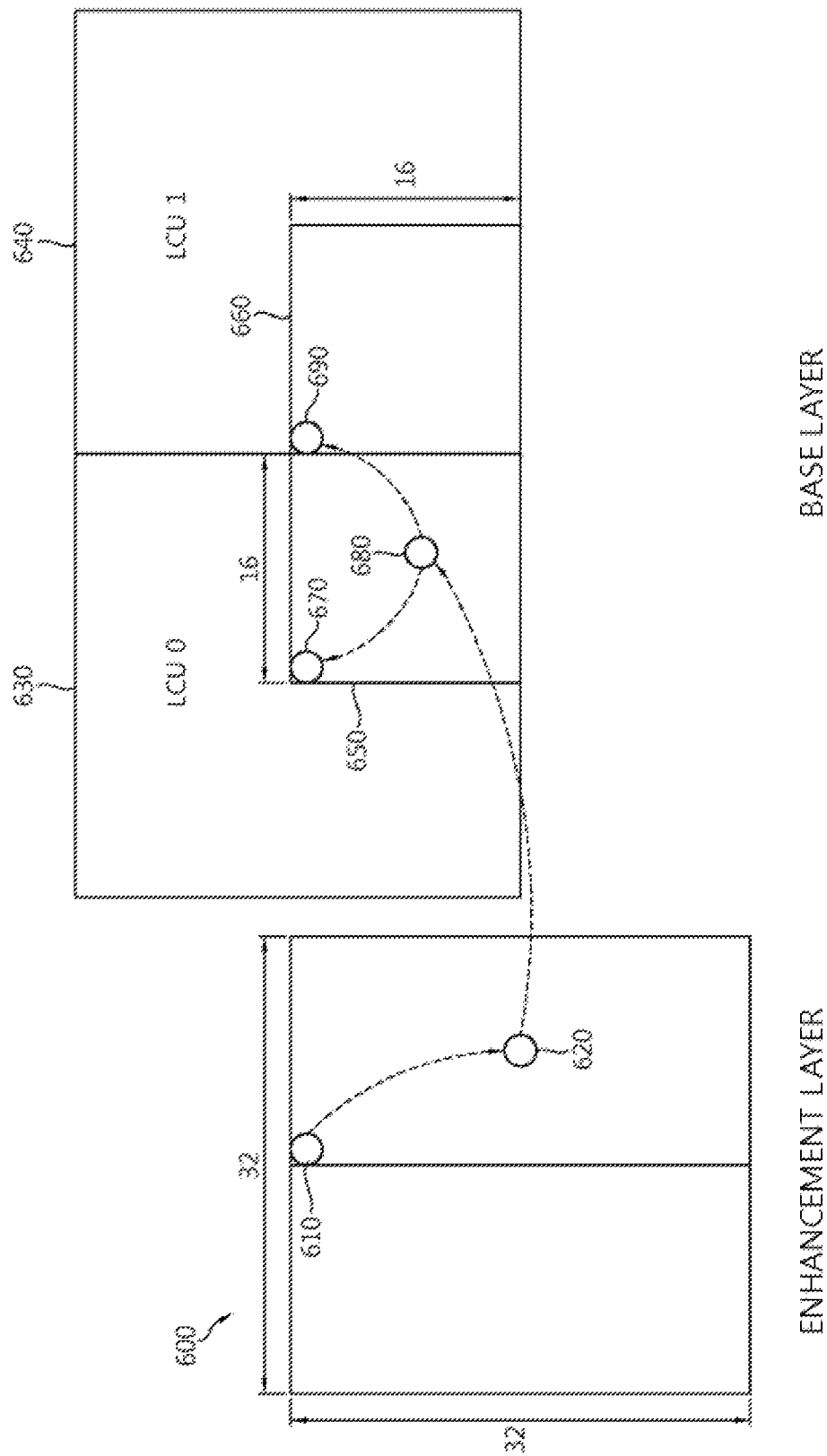
FIG. 6 is a view schematically explaining a method for deriving a location at which a motion vector is stored, according to a further example of the present invention.

FIG. 6 is a view for schematically explaining the method for deriving the location at which a motion vector is stored, according to a further example of the present invention. In the example of FIG. 6, the case in which the size of a coding block 600 of an enhancement layer is 32×32 and the size of a corresponding block of a base layer is 16×16 is described.

In the example of FIG. 6, when a current block is the second partition of the block 600 and the location of a sample 610 in the upper-left corner is (16, 0), as illustrated in the drawing, the location of a sample 620 in the center, which specifies the current block, becomes (24, 8).

When the value of scaledW is 2PicWRL and the value of scaledH is 2PicWRH, the location 680 of the reference layer, corresponding to (24, 8), becomes (12, 4).

The example of FIG. 6 shows the case in which the motion vector storage location becomes the location 670 included in LCU0 630 of the reference layer when Equation 10 is applied, whereas the motion vector storage location becomes the location 690 included in LCU1 640 of the reference layer when Equation 14 is applied.

Figure 7:
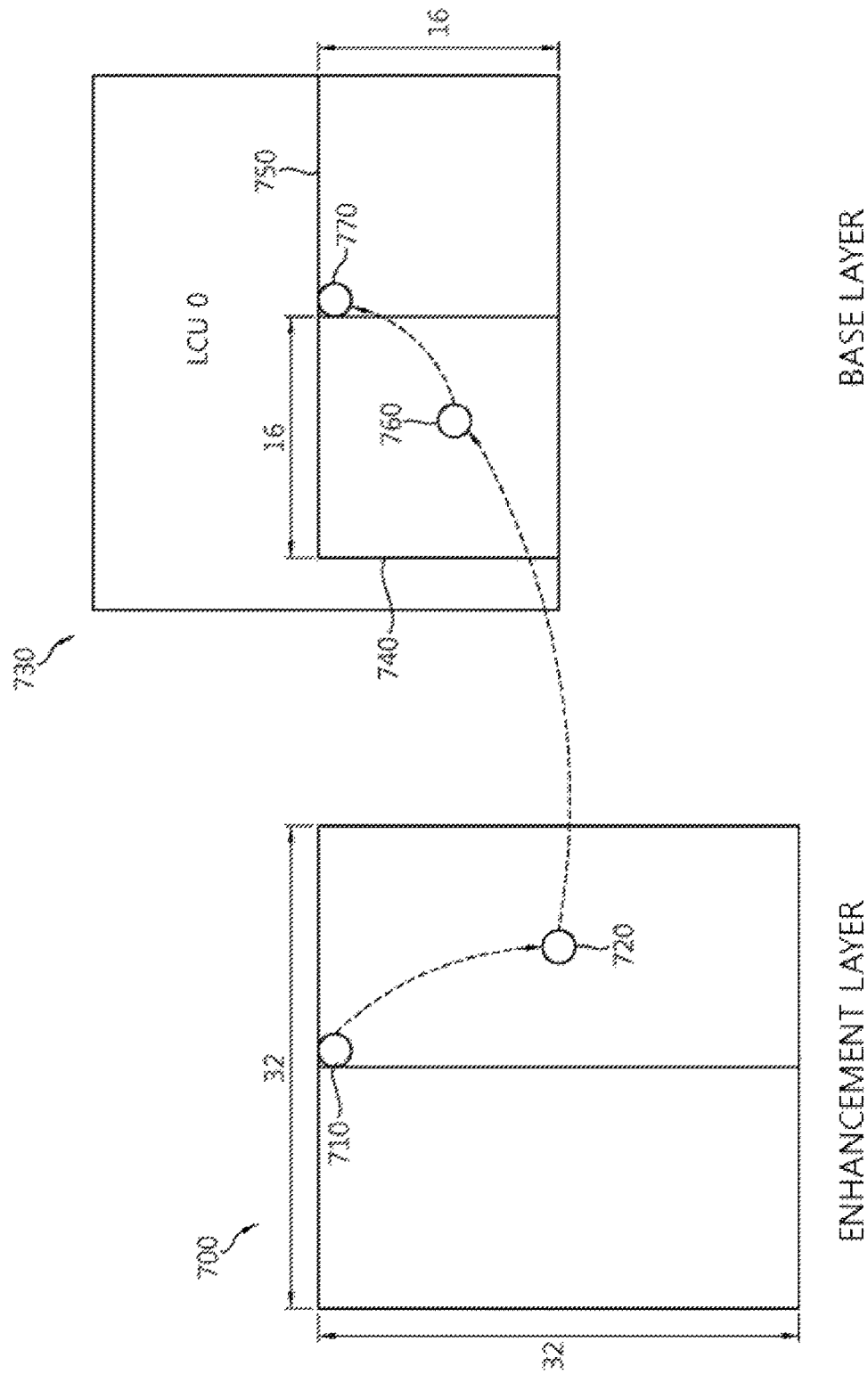
FIG. 7 is a view schematically explaining a method for deriving a location at which a motion vector is stored, according to yet another example of the present invention.

FIG. 7 is a view schematically explaining the method for deriving the location at which a motion vector is stored, according to yet another example of the present invention. In the example of FIG. 7, the case in which the size of a coding block 700 of an enhancement layer is 32×32 and the size of a corresponding block of a base layer is 16×16 is described.

In the example of FIG. 7, when a current block is the second partition of the block 700 and the location of a top-left sample 710 is (16, 0), as illustrated in the drawing, the location of a sample 620 in the center, which specifies the current block, becomes (24, 8).

When the value of scaledW is 2PicWRL and the value of scaledH is 2PicWRH, the location 760 of the reference layer, corresponding to (24, 8), becomes (12, 4).

Figure 8:
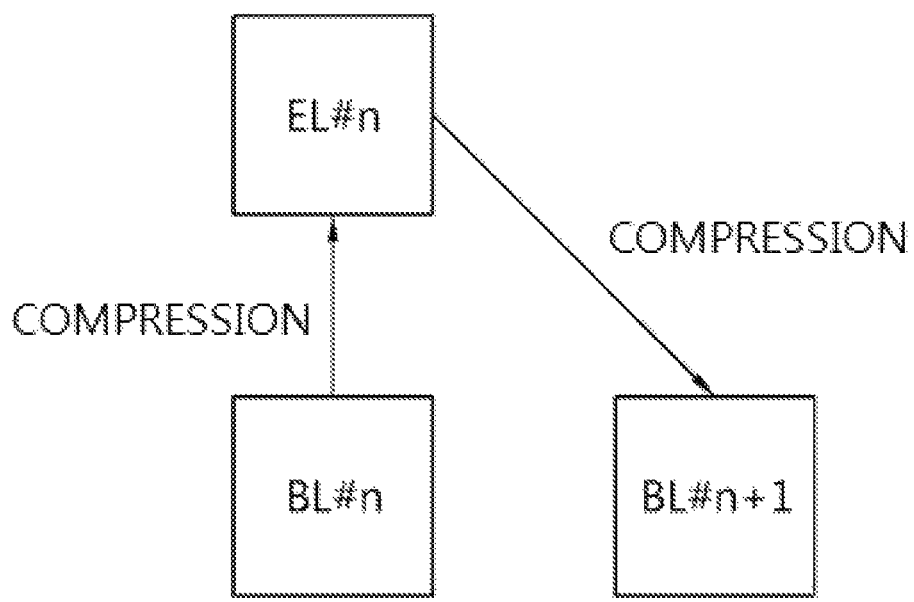
FIG. 8 is a view schematically explaining a method for storing motion information in a multi-layer structure according to the present invention.

The example of FIG. 8 shows the case in which the motion vector storage location becomes the location 770 in the LCU 730 of the reference layer regardless of whether Equation 10 or Equation 14 is applied.

Therefore, according to the present invention, (i) an embodiment in which Equation 10 is applied to both the case of FIG. 6 and the case of FIG. 7 may be used, (ii) an embodiment in which Equation 14 is applied to both the case of FIG. 6 and the case of FIG. 7 may be used, (iii) an embodiment in which the case of FIG. 6 uses Equation 10 and the case of FIG. 7 uses Equation 14 may be used, and (iv) an embodiment in which the case of FIG. 6 uses Equation 14 and the case of FIG. 7 uses Equation 10 may be used.

Meanwhile, the motion vector may be stored in 8×8 block units rather than in 16×16 block units.

FIG. 8 is a view for schematically explain a method using an inter-layer motion vector when a motion vector is stored in 8×8 block units in the enhancement layer.

In this case, because the motion vector is stored in 16×16 block units in the base layer, when a motion vector is derived from the nth block 810 of the base layer and applied to the nth block 820 of the enhancement layer, the motion vector storage unit is compressed by ½. Also, when a motion vector is derived from the nth block 820 of the enhancement layer and applied to the (n+1)th block 830 of the base layer, four motion vector storage units are compressed into one motion vector storage unit.

When the location on a reference layer (base layer) corresponding to a sample specifying the current block of a current layer (enhancement layer) is (xRef, yRef) and when the motion vector storage unit of the enhancement layer is an 8×8 block, the motion vector of the base layer is also derived according to a block corresponding to the storage unit of the enhancement layer. Therefore, the location (xRef0, yRef0) from which the motion vector is derived is represented as Equation 19.

$$x\text{Ref0} = (x\text{Ref} >> 3) << 3$$

$$y\text{Ref0} = (y\text{Ref} >> 3) << 3 \qquad \text{<Equation 19>}$$

Unlike Equation 19, even if the motion vector storage unit of the enhancement layer is an 8×8 block, an offset may be applied.

In this case, the location (xRef0, yRef0) from which the motion vector is derived in the base layer is represented as Equation 20.

$$x\text{Ref0} = ((x\text{Ref} + f) >> 3) << 3$$

$$y\text{Ref0} = ((y\text{Ref} + f) >> 3) << 3 \qquad \text{<Equation 20>}$$

Here, the offset, f, is an integer in the range of 0 to 7.

In the process of decoding a reference layer (base layer), an encoder and a decoder may store a motion vector in a motion vector storage unit specified by the location (xRef0, yRef0) of the reference layer.

In the process of decoding the current layer (enhancement layer), the encoder and decoder may obtain the stored motion vector for the location (xRef0, yRef0) on the reference layer from memory (buffer) as the motion vector of the reference layer corresponding to the current block.

Meanwhile, when (xRef0, yRef0) falls outside of the picture area of the reference layer, a motion vector may not be used. For example, when the derived xRef0 is less than 0 or is equal to or greater than PicWRL, which is the width of the picture of the reference layer, or when the derived yRef0 is less than 0 or is equal to or greater than PicHRL, which is the height of the picture of the reference layer, the motion vector of the reference layer may not be applied to the current block.

(4) Scaling the Derived Motion Information (for Example, Motion Vector) to be Used as Motion Information of the Current Layer In inter-layer prediction using motion information of a reference layer, the samples of the reference layer are resampled according to the resolution of the current layer, and are used as a reference picture for the inter-layer prediction.

Similarly, when the size of the reference layer picture is different from the size of the reference layer picture adjusted according to the resolution of the current layer, the motion vector derived in (3) may be scaled and applied to the current block.

The reference layer picture adjusted according to the resolution of the current layer may be a picture that is sampled according to the resolution of the current layer. Here, the case in which the size of the reference layer picture is different from the size of the reference layer picture adjusted according to the resolution of the current layer may mean that the size of the resampled picture of the reference layer is different from the size of the picture of the current layer.

Also, the reference layer picture adjusted according to the resolution of the current layer may be a picture having a width and height to which an offset is applied according to the resolution of the current layer before the picture is resampled. Here, the case in which the size of the reference layer picture is different from the size of the reference layer picture, adjusted according to the resolution of the current layer, may mean that the size of the reference layer picture is different from the size of the reference layer picture to which the offset is applied.

For example, when the width of the reference layer picture is different from the width of the reference layer picture adjusted according to the resolution of the current layer, the encoder and the decoder may perform scaling on the x-component of the motion vector derived in (3) (that is, the derived motion vector of the reference layer corresponding to the current block).

When the height of the reference layer picture is different from the height of the reference layer picture adjusted according to the resolution of the current layer, the encoder and the decoder may perform scaling on the y-component of the motion vector derived in (3) (that is, the derived motion vector of the reference layer, corresponding to the current block).

An encoding device and a decoding device may perform prediction on the current block using a motion vector derived through the processes (1) to (4).

In a multi-layer structure, the dependency between layers may be categorized into three types, that is, dependency in which inter-layer sample prediction is possible, dependency in which inter-layer motion prediction is possible, and dependency in which inter-layer sample prediction and inter-layer motion prediction are both possible.

When inter-layer motion prediction is possible, the slice type for the reference slice of an inter-layer reference picture, the number of reference picture indexes to be activated, and the like may be set to be identical to the values of the first slice of the reference layer picture.

In this case, when the spatial scalability of the current layer is the same as the spatial scalability of the reference layer, the values of the layer may be set to be identical to the values of the picture of the reference layer in which the motion field of the reference picture is decoded. Here, the case in which the spatial scalability is the same includes the case in which the size of the picture of the current layer is the same as the size of the picture of the reference layer. Also, the motion field includes a prediction mode, a reference picture index, a motion vector, an available prediction list information, and the like.

When the spatial scalability of the current layer is not the same as the spatial scalability of the reference layer, a motion vector scaled through the processes (1) to (4) may be used as a motion vector for the current block.

The above-described method according to the present invention may be implemented as a program that can be executed by various computer means, and may be recorded on a computer-readable storage medium. Examples of the computer-readable storage medium include ROM, RAM, CD-ROM, a magnetic tape, a floppy disk, optical data storage, and the like, and may be implemented in the form of carrier waves (for example, transmission over the Internet).

The computer-readable storage medium may be distributed in a computer system connected by a network, and codes that computers can read may be stored and executed using a distributed method. Also, functional programs, codes, and code segments for implementing the above method may be easily understood by programmers of the technical fields including the present invention.

While the methods have been described as steps or blocks on the basis of flowcharts in the above embodiments, the present invention is not limited to the order of steps and some steps can be generated in a different sequence or simultaneously. It will be understood by those skilled in the art that steps of a flowchart are not exclusive and can include other steps, or one or more steps of the flowchart can be deleted without affecting the scope of the present invention.

The above description is merely an illustration of the technical spirit of the present invention, and those having ordinary knowledge in the technical field to which the present invention pertains can make modifications and variations within the range that does not depart from the essential characteristics of the present invention. Accordingly, the disclosed embodiments of the present invention are not intended to limit the technical spirit of the present invention but to illustrate the technical spirit of the present invention, and the scope of the technical spirit of the present invention is not limited to these embodiments. The range of protection of the present invention should be interpreted based on the following claims, and all technical spirit within the range equivalent to the claims should be construed as falling within the range of the rights of the present invention.

The invention claimed is:

1. A video decoding method supporting a multi-layer structure, the video decoding method comprising:
specifying a current layer criterion location that specifies a current block in a current layer;
specifying a reference layer criterion location, corresponding to the current layer criterion location, in a reference layer;
deriving a motion information storage location in the reference layer by adding the reference layer criterion location and an offset, based on a size of the motion information storage unit;
deriving motion information corresponding to the derived motion information storage location; and
scaling the derived motion information and deriving the scaled motion information as a motion vector to be used for reconstructing a picture in the current layer,
wherein the current layer criterion location is a location of a lower-right sample of a center of the current block, and
wherein a location of a top-left sample of the current block is (xP, yP), the current block is a block having a size of 16×16, and the current layer criterion location is (xP +8, yP +8).

2. The video decoding method of claim 1, wherein the reference layer criterion location is determined based on the current layer criterion location, a size of a picture of the reference layer, and a scaling ratio between the current layer and the reference layer.

3. The video decoding method of claim 2, wherein the scaling ratio is a value obtained by dividing a resolution of the current layer by a resolution of the reference layer.

4. The video decoding method of claim 2, wherein the scaling ratio is a value obtained by dividing a resolution of the current layer by a resolution of the reference layer, and the reference layer criterion location is determined based on a ratio between the current layer criterion location and the scaling ratio.

5. The video decoding method of claim 1, wherein the motion information storage location specifies a location of a motion information storage unit which the motion vector is stored, wherein the motion information storage location is a top-left sample of the motion information storage unit.

6. The video decoding method of claim 1, wherein the motion information storage unit is a 16×16 block, and the motion information storage location, (xRef0, xRef0) is as follows, $$xRef0=((xRef+f)>>4)<<4$$

$$yRef0=((yRef+f)>>4)<<4$$

where (xRef, yRef) denotes the reference layer criterion location and f denotes an offset having an integer value ranging from 0 to 15.

7. The video decoding method of claim 6, wherein the value of f is 4.

8. A video encoding method supporting a multi-layer structure, the video encoding method comprising:
specifying a current layer criterion location that specifies a current block in a current layer;
specifying a reference layer criterion location, corresponding to the current layer criterion location, in a reference layer;
deriving a motion information storage location in the reference layer by adding the reference layer criterion location and an offset, based on a size of the motion information storage unit;
deriving motion information corresponding to the derived motion information storage location; and
scaling the derived motion information and deriving the scaled motion information as a motion vector to be used for reconstructing a picture in the current layer, wherein the current layer criterion location is a location of a lower-right sample of a center of the current block, and wherein a location of a top-left sample of the current block is (xP, yP), the current block is a block having a size of 16×16, and the current layer criterion location is (xP +8, yP +8).

9. The video encoding method of claim 8, wherein the reference layer criterion location is determined based on the current layer criterion location, a size of a picture of the reference layer, and a scaling ratio between the current layer and the reference layer.

10. The video encoding method of claim 9, wherein the scaling ratio is a value obtained by dividing a resolution of the current layer by a resolution of the reference layer.

11. The video encoding method of claim 9, wherein the scaling ratio is a value obtained by dividing a resolution of the current layer by a resolution of the reference layer, and the reference layer criterion location is determined based on a ratio between the current layer criterion location and the scaling ratio.

12. The video encoding method of claim 8, wherein the motion information storage location specifies a location of a motion information storage unit which the motion vector is stored, wherein the motion information storage location is a location of a top-left sample of the motion information storage unit.

13. The video encoding method of claim 8, wherein the motion information storage unit is a 16×16 block, and
the motion information storage location, (xRef0, xRef0) is as follows, $$x\text{Ref0}=((x\text{Ref}+f)>>4)<<4$$

$$y\text{Ref0}=((y\text{Ref}+f)>>4)<<4$$

where (xRef, yRef) denotes the reference layer criterion location, and f denotes an offset having an integer value ranging from 0 to 15.

14. The video encoding method of claim 13, wherein the value of f is 4.

* * * * *